(12) United States Patent
Gladden et al.

(10) Patent No.: US 6,553,764 B1
(45) Date of Patent: Apr. 29, 2003

(54) ENHANCED RESPONSE TURBOCHARGER USING FLYWHEEL STORAGE

(75) Inventors: John R. Gladden, Lafayette, IN (US); Beth A. Hinchee, Kiel (DE)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/025,697

(22) Filed: Dec. 19, 2001

(51) Int. Cl.[7] ............................................... F02B 37/10
(52) U.S. Cl. .................................................. 60/608
(58) Field of Search .................. 60/602, 607, 608, 60/280

(56) References Cited

U.S. PATENT DOCUMENTS

| | | | |
|---|---|---|---|
| 3,007,302 A | 11/1961 | Vincent | 60/13 |
| 3,048,005 A | 8/1962 | Egli et al. | 60/13 |
| 3,238,713 A | 3/1966 | Wallace | 60/13 |
| 3,673,797 A | 7/1972 | Wilkinson | 60/13 |
| 4,145,888 A | 3/1979 | Roberts | 60/608 |
| 4,312,183 A | 1/1982 | Regar | 60/608 |
| 4,798,257 A | 1/1989 | Kawamura et al. | 180/165 |
| 4,833,887 A | 5/1989 | Kawamura et al. | 60/608 |
| 4,882,905 A | 11/1989 | Kawamura | 60/608 |
| 4,958,497 A * | 9/1990 | Kawamura | 60/608 |
| 4,989,410 A | 2/1991 | Smith | 60/607 |
| 5,012,906 A | 5/1991 | Meyer et al. | 192/56 |
| 5,074,115 A | 12/1991 | Kawamura | 60/608 |
| 5,076,059 A | 12/1991 | Okada | 60/608 |
| 5,214,333 A * | 5/1993 | Kawamura | 60/608 |
| 5,341,060 A | 8/1994 | Kawamura | 310/153 |
| 5,406,797 A | 4/1995 | Kawamura | 60/608 |
| 5,729,978 A | 3/1998 | Hiereth et al. | 60/607 |
| 6,062,026 A * | 5/2000 | Woollenweber et al. | 60/605.2 |

FOREIGN PATENT DOCUMENTS

JP      JA 59-5832 A * 1/1984 .................. 60/608

* cited by examiner

*Primary Examiner*—Sheldon Richter
(74) *Attorney, Agent, or Firm*—Todd T Taylor

(57) ABSTRACT

A turbocharger system for use in an internal combustion engine, and particularly suitable for use in an on-road vehicle, is provided with a turbocharger including a turbine, a compressor and a turboshaft coupling the turbine and the compressor together; mechanically coupling a first motor/generator to the turboshaft; mechanically coupling a second motor/generator to a flywheel; electrically coupling the second motor/generator to the first motor/generator; storing power in the flywheel using the second motor/generator during periods of excess turbocharger boost; and rotating the turbocharger shaft using the first motor/generator during periods of insufficient turbocharger boost. The turbocharger system provides a compact and efficient method of storing energy in the flywheel during periods of excess turbocharger boost, and retrieving energy from the flywheel during periods of insufficient turbocharger boost.

15 Claims, 1 Drawing Sheet

ENHANCED RESPONSE TURBOCHARGER USING FLYWHEEL STORAGE

TECHNICAL FIELD

This invention relates generally to internal combustion engines, and, more particularly, to turbochargers used in conjunction with an internal combustion engine.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of an engine.

An internal combustion engine, therefore, may include one or more turbochargers for compressing air to be supplied to one or more combustion chambers within corresponding combustion cylinders. The turbocharger supplies combustion air at a higher pressure and higher density than existing atmospheric pressure and ambient density. The use of a turbocharger can compensate for lack of power due to altitude, or to increase the power that can be obtained from an engine of a given displacement, thereby reducing the cost, weight and size of an engine required for a given power output.

A turbocharger typically includes a turbine driven by exhaust gases from the engine, and a compressor driven by the turbine. The compressor receives the air to be compressed and supplies the air to the combustion chamber. A common shaft interconnects the turbine wheel of the turbine with the compressor wheel in the compressor section. A stream of exhaust gases from the engine is conducted from the exhaust manifold to the turbine. The stream of exhaust gases passing through the turbine causes the turbine wheel to rotate, thereby turning the common shaft interconnecting the turbine wheel and the compressor wheel and rotating the compressor wheel.

Ambient air to be used for combustion in the internal combustion engine is brought into the compressor section, through an inlet for the compressor. The air is compressed by the compressor wheel, and is directed to the inlet manifold of the internal combustion engine.

Several problems are experienced with previously known constructions for turbochargers as described above. For instance, turbochargers generally take some time when increased power demands are placed on the system to gain speed and provide increased pressure. Therefore, when the motor is running under conditions which require quick acceleration, a delay period occurs while the turbocharger accelerates and desired instantaneous acceleration cannot be achieved.

One solution is described in U.S. Pat. No. 5,341,060 (Kawamura), entitled "ENGINE WITH A FLYWHEEL GENERATOR." According to Kawamura, providing a device for controlling a turbocharger with an electric rotary machine optimizes boost pressure, according to the depth to which an accelerator pedal is depressed. Specifically, a turbocharger, which is coupled to an internal combustion engine, is supplied with an electric rotary machine with a rotor. The rotary machine and rotor are coupled to a power converter, which in turn is joined to a battery. The rotary machine and rotor are battery powered when in a motor mode and supply power to the battery in a generator mode.

While Kawamura provides boost to the turbocharger, the Kawamura solution has limitations making it less effective. Reliance on a battery introduces problems, including poor cold weather performance, maintenance, weight, and short life span. These problems are accentuated with a power converter where additional power is lost. Moreover, Kawamura only provides an electrical connection, which is subject to corrosion and decay.

U.S. Pat. No. 4,312,183 (Regar) discloses an exhaust gas turbocharger for diesel engines including a turbocharger having a turbine and a compressor interconnected via a turboshaft. A flywheel separate from the turboshaft is selectively coupled and decoupled from a turboshaft using a freewheel or overriding clutch. A summation mechanism such as a planetary gear arrangement is interposed between the clutch and freewheel. Regar '183 therefore provides an apparatus for mechanically interconnecting a freewheel with a turboshaft of a turbocharger.

The present invention is directed to overcoming one or more of the problems as set forth above.

SUMMARY OF THE INVENTION

In one aspect of the invention, a turbocharger system for use in an internal combustion engine is provided with a turbocharger including a turbine, a compressor and a turboshaft coupling the turbine to the compressor. A first motor/generator is mechanically coupled to the turboshaft. A second motor/generator is mechanically coupled to a flywheel and is electrically coupled to the first motor/generator.

In another aspect of the invention, a method of powering a turbocharger system is provided with the steps of providing a turbocharger including a turbine, a compressor and a turboshaft coupling the turbine and the compressor together; mechanically coupling a first motor/generator to the turboshaft; mechanically coupling a second motor/generator to a flywheel; electrically coupling the second motor/generator to the first motor/generator; storing power in the flywheel using the second motor/generator during periods of excess turbocharger boost; and rotating the turbocharger shaft using the first motor/generator during periods of insufficient turbocharger boost.

DETAILED DESCRIPTION

Figure 1:
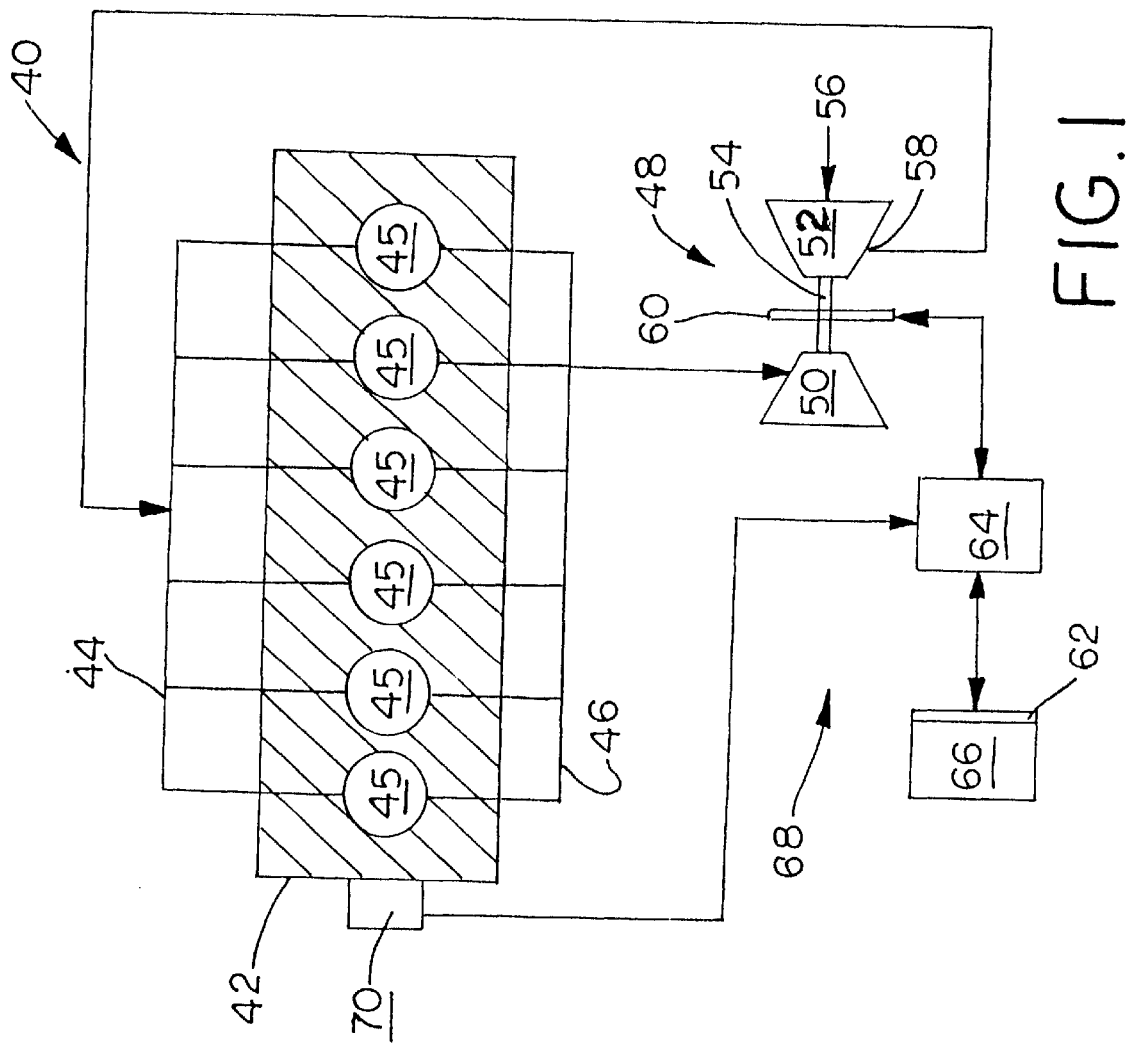
FIG. 1 is a schematic view of an embodiment of an internal combustion engine of the present invention.

Referring to FIG. 1, an embodiment of an internal combustion engine 40 of the present invention includes an engine block 42 with an intake manifold 44, combustion cylinders 45, an exhaust manifold 46, a turbocharger 48 and a flywheel 66.

Turbocharger 48 has a turbine 50, a turboshaft 54 and a compressor 52. Turbine 50 is in operable communication with exhaust manifold 46 which is operably coupled to combustion cylinders 45. Turbine 50 is coupled with turboshaft 54.

Compressor 52, also coupled to turboshaft 54, includes an air inlet 56 and an air outlet 58. Air outlet 58 is in operable communication with intake manifold 44 which in turn is in operable communication with combustion cylinders 45. Turbocharger 48 and flywheel 66 together with any interconnecting components forms a turbocharger system 68.

Flywheel 66 is electrically coupled to turboshaft 54 via first motor/generator 60 and second motor/generator 62.

First motor/generator 60 mechanically couples to turboshaft 54. Second motor/generator 62 is mechanically coupled to flywheel 66 and is electrically coupled to first motor/generator 60.

Combustion engine 40 may be provided with a controller 64 which is operably coupled to and between turbocharger 48 and flywheel 66. Controller 64 may also interconnect with sensor 70 mounted on engine block 42 for sensing an operating condition associated with internal combustion engine 40.

INDUSTRIAL APPLICABILITY

During use, exhaust generated in combustion cylinders 45 is exhausted out exhaust manifold 46 and rotatably drives turbine 50. Turbine 50 transmits the rotational force through turboshaft 54 to compressor 52. Compressor 52 receives air at air inlet 56, compresses the air and communicates the compressed air to intake manifold 44 for use in combustion cylinders 45.

Rotation of turboshaft 54 may operate first motor/generator 60 to transmit electrical power to second motor/generator 62, which rotatably drives and stores power in flywheel 66 during periods of excess boost.

During periods of insufficient boost, such as during periods of high load, high torque demand at low engine speed, engine starting, or at start-up acceleration of turbocharger 48, rotational energy stored in flywheel 66 is used to drive second motor/generator 62 as a generator, which drives first motor/generator 60 as a motor, which rotatably drives turboshaft 54. The rotational energy within flywheel 66 is used to more quickly accelerate the rotational speed of turboshaft 54, and thus in turn the rotational speed of the compressor wheel within compressor 52.

Controller 64 coordinates turbocharger 48 and flywheel 66. Controller 64 may receive a sensor signal from sensor 70 coupled with engine block 42. Controller 64 may coordinate control dependent upon boost, engine speed, cylinder pressure, smoke opacity, emission rate of carbon dioxide, carbon monoxide, and nitrogen oxides, exhaust gas recirculation rate, exhaust gas temperature, combustion knock, flame speed, driven generator frequency, current output of driven generator, intake manifold absolute pressure, throttle position, throttle command signal, fuel delivery dwell time, propeller position command signal for marine propulsion with controllable pitch propeller, engine start signal, flywheel speed, turbo speed, power demand, fuel use, altitude, barometric pressure, airflow, inlet manifold temperature, and inlet temperature to compression. Controller 64 modulates turbocharger input to produce sufficient air while preventing excess boost, surge and excessive turbo speed.

Internal combustion engine 40 offers advantages over that previously hereto contrived. For example, the present designs are stronger and less prone to performance difficulties resulting from weather and wear. These designs also allow for either electrical or mechanical connection between the flywheel and the turbocharger. Energy conversions in the case of internal combustion engine 40 are maintained at a minimum, improving efficiency of the overall system. Internal combustion engine 40 provides spacial advantages and a smaller structure, due to the types of components used, which can be moved and oriented in a variety of directions.

Other aspects, objects and advantages of this invention can be obtained from a study of the drawings, the disclosure and the appended claims.

What is claimed is:

1. A turbocharger system for use in an internal combustion engine, comprising:

a turbocharger including a turbine, a compressor and a turboshaft coupling said turbine and said compressor together;

a first motor/generator mechanically coupled to said turboshaft;

a flywheel; and a second motor/generator mechanically coupled to said flywheel and electrically coupled to said first motor/generator.

2. The turbocharger system of claim 1, including a controller electrically coupled with said first motor/generator and said second motor/generator.

3. The turbocharger system of claim 2, said controller being electrically coupled in a bi-directional manner with said first motor/generator and said second motor/generator.

4. The turbocharger system of claim 2, including a sensor coupled with said controller, said sensor configured for sensing at least one of: engine speed, power demand, cylinder pressure, smoke opacity, emission rate of carbon dioxide, carbon monoxide, and nitrogen oxides, exhaust gas recirculation rate, exhaust gas temperature, combustion knock, flame speed, driven generator frequency, current output of driven generator, intake manifold absolute pressure, throttle position, throttle command signal, fuel delivery dwell time, propeller position command signal for marine propulsion with controllable pitch propeller, engine start signal, flywheel speed, fuel rate, altitude, barometric pressure, airflow, inlet manifold temperature, turbocharger speed, turbocharger boost, and compressor inlet temperature.

5. An internal combustion engine, comprising:

an intake manifold and an exhaust manifold;

a turbocharger including a turbine, a compressor and a turboshaft coupling said turbine and said compressor together, said turbine fluidly coupled with said exhaust manifold and said compressor fluidly coupled with said intake manifold;

a first motor/generator mechanically coupled to said turboshaft;

a flywheel; and a second motor/generator mechanically coupled to said flywheel and electrically coupled to said first motor/generator.

6. The internal combustion engine of claim 5, including a controller electrically coupled with said first motor/generator and said second motor/generator.

7. The internal combustion engine of claim 6, said controller being electrically coupled in a bi-directional manner with said first motor/generator and said second motor/generator.

8. The internal combustion engine of claim 6, including a sensor coupled with said controller, said sensor configured for sensing at least one of: engine speed, power demand, cylinder pressure, smoke opacity, emission rate of carbon dioxide, carbon monoxide, and nitrogen oxides, exhaust gas recirculation rate, exhaust gas temperature, combustion knock, flame speed, driven generator frequency, current output of driven generator, intake manifold absolute pressure, throttle position, throttle command signal, fuel delivery dwell time, propeller position command signal for marine propulsion with controllable pitch propeller, engine start signal, flywheel speed, fuel rate, altitude, barometric pressure, airflow, inlet manifold temperature, turbocharger speed, turbocharger boost, and compressor inlet temperature.

9. A method of powering a turbocharger system, comprising the steps of:

providing a turbocharger including a turbine, a compressor and a turboshaft coupling said turbine and said compressor together;

mechanically coupling a first motor/generator to said turboshaft;

mechanically coupling a second motor/generator to a flywheel;

electrically coupling said second motor/generator to said first motor/generator;

storing power in said flywheel using said second motor/generator during periods of excess turbocharger boost; and rotating said turbocharger shaft using said first motor/generator during periods of insufficient turbocharger boost.

10. The method of powering a turbocharger system of claim 9, said first motor/generator acting as a generator and said second motor/generator acting as a motor during said storing step.

11. The method of powering a turbocharger system of claim 9, said second motor/generator acting as a generator and said first motor/generator acting as a motor during said rotating step.

12. The method of powering a turbocharger system of claim 9, including the step of electrically coupling a controller with said first motor/generator and said second motor/generator.

13. The method of powering a turbocharger system of claim 12, said controller being electrically coupled in a bi-directional manner with said first motor/generator and said second motor/generator.

14. The method of powering a turbocharger system of claim 12, including the step of coupling a sensor with said controller, and sensing with said sensor at least one of: engine speed, power demand, cylinder pressure, smoke opacity, emission rate of carbon dioxide, carbon monoxide, and nitrogen oxides, exhaust gas recirculation rate, exhaust gas temperature, combustion knock, flame speed, driven generator frequency, current output of driven generator, intake manifold absolute pressure, throttle position, throttle command signal, fuel delivery dwell time, propeller position command signal for marine propulsion with controllable pitch propeller, engine start signal, flywheel speed, fuel rate, altitude, barometric pressure, airflow, inlet manifold temperature, turbocharger speed, turbocharger boost, and compressor inlet temperature.

15. The method of powering a turbocharger system of claim 12, including the step of controlling said turbocharger using said controller to inhibit at least one of excess boost, surge and speed of said turbocharger.

* * * * *